United States Patent Office 2,789,768
Patented Apr. 23, 1957

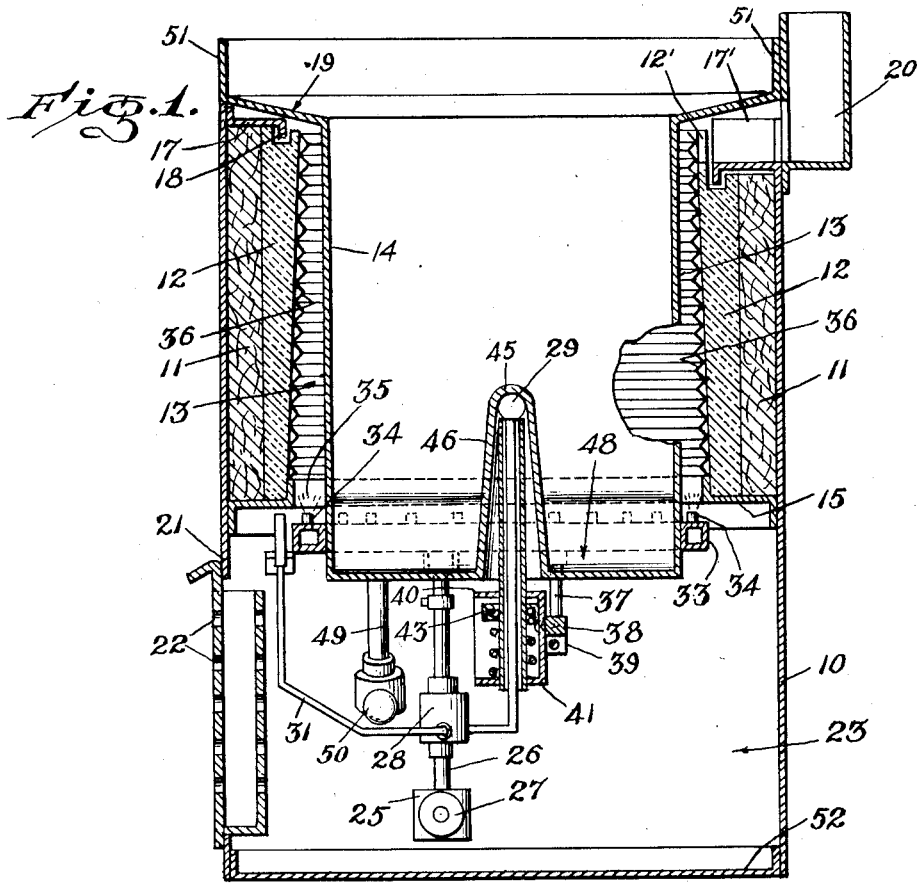

2,789,768

THERMO-BULB HEAT CONTROL FOR DEEP FRYING APPARATUS

Walter Kennedy, Cliffside Park, N. J.; The United National Bank of Cliffside Park, administrator of said Walter Kennedy, deceased, assignor to William D. Kennedy, Englewood, N. J.

Application June 10, 1952, Serial No. 292,629

3 Claims. (Cl. 236—32)

This invention relates to what is generally referred to as deep frying apparatus for preparation of various food products. More particularly, the invention deals with an apparatus of this type and kind, wherein an efficient distribution of the heating medium employed is provided and, further, wherein a more accurate control is provided for the temperature of the fat or frying medium employed. Still more particularly, the invention deals with an apparatus of the character described having means for draining the vessel employed and, further, wherein the apparatus is so constructed as to facilitate quick removal of the vessel for cleaning and other purposes.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a sectional view, diagrammatically illustrating an apparatus made according to my invention; and Fig. 2 is a broken or irregular section generally viewed at right angles to and from the left of Fig. 1, with parts in section and parts in elevation.

In the accompanying drawing, I have, in a somewhat diagrammatic manner illustrated, an apparatus made according to my invention, in which 10 represents a casing portion, the upper walls of which are insulated, as seen at 11, and support a radiant, or radiants, 12, which are exposed to a combustion chamber 13. The radiants 12 are positioned within the casing 10 and the insulation 11 and are spaced from outer walls of a pot or vessel 14. In the construction shown, the pot or vessel 14 is rectangular in form and the radiants and casing will conform to the contour of the vessel.

The insulation 11 and radiants 12 are supported on an inwardly extending flange 15, the flange 15 having an upwardly extending portion 16, which hold the radiants in place and the radiants are further held in place by an inwardly extending upper flange 17 engaging recess 18 in the upper edges of the radiants.

It will be apparent that the pot or vessel 14 has an outwardly extending flange 19 which seats on the radiants 12 and flange 17, as clearly indicated at the left of Fig. 1 of the drawing.

At the right side of the apparatus, as shown, which is actually the rear portion of the casing 10, part of the radiant on the rear wall is cut out to form a flue passage 12' therein and, in like manner, the flange 17 is depressed to form a registering passage 17' with the passage 12' and the latter opens into a flue 20 fixed to the back wall of the casing 10. The flue 20 provides discharge for products of combustion from the chamber 13.

The lower front portion of the casing 10 has an opening 21 controlled by an openwork door 22 employed for admitting air to the lower compartment or chamber 23 of the casing and also to give access to mechanism disposed in the compartment 23.

Supported in the casing 10 is a gas supply pipe, part of which is shown at 24, in Fig. 2 of the drawing. At 25 is a suitable fitting, with which couples a discharge pipe 26 and discharge of gas is controlled by a suitable valve 27.

The pipe 26 opens into a control device, or casing, 28, with which couples a thermo-bulb 29 through the medium of a flexible tube 30. Extending from the device 28 is a small tube 31 which leads to a pilot light 32, the latter being arranged adjacent one side of a rectangular burner tube 33. The burner tube has a series of spaced nozzles, part of which are seen at 34 in Fig. 1 of the drawing and these nozzles are located at the entrance 35 to the combustion chamber 13.

It will thus be apparent that the irregular outer surfaces 36 of the radiants 12 will be heated in providing radiant heat in the chamber 13 for heating the pot or vessel 14.

The burner 33 is mounted on suitable supports, as at 37, Fig. 2, these supports extending upwardly from a cross-frame or strip 38, the latter being supported on side walls of the casing 10, as indicated at 39 in Fig. 2 of the drawing.

Also supported on the strip 38 centrally of the casing are a pair of flange plates 40 and 41, in the flanges of which is slidably supported a tube 42 on the upper end of which seats the bulb 29. The stem of the bulb passes downwardly through the tube 42 and is coupled with the flexible tube 30. Secured to the tube 42 is a collar 43, which forms a seat for a spring 44, the spring also seating on the flange of the bottom plate 41. The purpose of this construction is to provide a resilient support of the bulb 29 so that the same can yieldably seat in the upper rounded portion 45 of a central cone 46 at the lower portion of the pot or vessel 14.

It will appear from a consideration of Figs. 1 and 2 of the drawing that the bottom wall 47 of the pot or vessel tapers downwardly from side walls thereof to form, around the cone 46, a drain pit 48.

Opening into the drain pit 48 is a drain pipe 49 having a control valve 50. It will be apparent that both of the valves 27 and 50 are accessible in the chamber 23 when the door 22 is opened.

The flange 19 of the pot is tapered upwardly and outwardly and has, at its periphery, a raised wall 51. This construction provides means for collecting drippings from products removed from the pot, so as to return the same to the pot as will be apparent.

It will be understood that the casing may be suitably supported and, as noted in Fig. 1, the chamber or compartment 23 is closed by a bottom wall 52.

One of the distinctive features in my improved construction resides in the provision of a heater for any type and kind of compartment, in which a pot or other receptacle is disposed and wherein the heater has peripheral radial walls heated by a burner positioned at the base of the radiants and substantially paralleling said walls.

In deep frying apparatus of the type and kind under consideration, the use of a pot having a thermo-bulb exposed to the interior of the pot and wherein the pot is readily detachable without disturbing the bulb is distinctly advantageous in facilitating the cleaning of the pot or vessel from time to time.

It will be apparent that a pipe 28' places the control device 28 in communication with the burner tube 33 as will clearly appear from a consideration of Fig. 2 of the drawing.

Having fully described my invention, what I claim as new and desire to secure by Letters Patent is:

1. A deep frying apparatus comprising a heated casing, open at the top, a pot mounted in the casing and having an outwardly extending flange supported on the top of the casing, said pot being freely insertable into and removable from the casing, a gas burner arranged at the lower portion of said pot for heating said pot when arranged in the casing, the pot having, centrally of the bottom wall thereof, an integral upwardly extending hollow small diameter conical portion opening through the bottom of the pot, said conical portion having a rounded dome end, a thermo-bulb fitting snugly in said closed end of the conical portion and freely removable through the bottom open end of said conical portion, and a control device in operative engagement with the supply of gas to said burner controlled by said bulb to regulate temperature of a liquid heated in said pot.

2. A deep frying apparatus comprising a heated casing, open at the top, a pot mounted in the casing and having an outwardly extending flange supported on the top of the casing, said pot being freely insertable into and removable from the casing, a gas burner arranged at the lower portion of said pot for heating said pot when arranged in the casing, the pot having, centrally of the bottom wall thereof, an integral upwardly extending hollow small diameter conical portion opening through the bottom of the pot, said conical portion having a rounded dome end, a thermo-bulb fitting snugly in said closed end of the conical portion and freely removable through the bottom open end of said conical portion, a control device in operative engagement with the supply of gas to said burner controlled by said bulb to regulate temperature of a liquid heated in said pot, said rounded dome end extending to the approximate vertical central portion of the pot, and means for yieldably supporting the bulb in engagement with said dome end portion.

3. In apparatus of the character described, comprising an insulated casing, a vessel mounted in the casing for free insertion and removal therewith, means for heating the vessel in the casing, the lower portion of the vessel including an upwardly extending small diameter tubular portion centrally thereof terminating in a domed closed end substantially centrally of the vessel, means yieldably supporting a thermo-bulb for pressure engagement with the dome end of said tubular portion, and means in said casing actuated by said thermo-bulb controlling said heating means.

References Cited in the file of this patent

UNITED STATES PATENTS

| | | |
|---|---|---|
| 528,272 | Land | Oct. 30, 1894 |
| 571,634 | Zumdahl | Nov. 17, 1896 |
| 878,908 | Terhorst | Feb. 11, 1908 |
| 947,914 | Junkers | Feb. 1, 1910 |
| 1,447,414 | Eustege | Mar. 6, 1923 |
| 1,606,255 | Mettler | Nov. 9, 1926 |
| 1,923,639 | O'Dowd | Aug. 22, 1933 |
| 1,996,434 | O'Dowd | Apr. 2, 1935 |
| 2,008,400 | Mott | July 16, 1935 |
| 2,428,642 | Weeks | Oct. 7, 1947 |
| 2,430,196 | Vaughan | Nov. 4, 1947 |
| 2,500,061 | Clark | Mar. 7, 1950 |
| 2,577,400 | Butterworth | Dec. 4, 1951 |